United States Patent
Peebles et al.

(10) Patent No.: US 6,805,285 B2
(45) Date of Patent: Oct. 19, 2004

(54) SELF-SERVICE TERMINAL HAVING A RECONFIGURABLE MEDIA ENTRY SLOT

(75) Inventors: John A. Peebles, Dundee (GB); Ahmad H. Ebrahimi, Dundee (GB)

(73) Assignee: NCR Corporation, Dayton, OH (US)

( * ) Notice: Subject to any disclaimer, the term of this patent is extended or adjusted under 35 U.S.C. 154(b) by 534 days.

(21) Appl. No.: 09/879,675

(22) Filed: Jun. 12, 2001

(65) Prior Publication Data

US 2001/0056403 A1 Dec. 27, 2001

(30) Foreign Application Priority Data

Jun. 24, 2000 (GB) .............................. 0015403

(51) Int. Cl.$^7$ .............................................. G06F 17/60
(52) U.S. Cl. ....................... 235/379; 235/380; 235/484
(58) Field of Search ................. 235/379, 381, 235/475, 482, 483, 484, 380; 902/8, 17, 30, 31, 41; 705/43; 271/124, 245; 209/534; 186/55; 109/24.1; 378/58

(56) References Cited

U.S. PATENT DOCUMENTS

| | | | | |
|---|---|---|---|---|
| 3,760,162 A | * | 9/1973 | Holter | 235/381 X |
| 3,779,542 A | * | 12/1973 | Barker et al. | 271/245 |
| 4,092,934 A | * | 6/1978 | Sayer | 109/24.1 |
| 4,301,361 A | * | 11/1981 | Lees | 235/484 |
| 4,578,569 A | * | 3/1986 | Arp et al. | 235/482 X |
| 4,803,349 A | * | 2/1989 | Sugimoto et al. | 235/475 |
| 4,883,183 A | * | 11/1989 | Kimura et al. | 209/534 |
| 5,146,070 A | * | 9/1992 | Toma | 235/475 |
| 5,401,013 A | * | 3/1995 | Hurd et al. | 271/124 |
| 5,646,392 A | * | 7/1997 | Oguchi | 235/475 |
| 5,710,637 A | * | 1/1998 | Matsumoto | 235/379 X |
| 5,721,420 A | * | 2/1998 | May | 235/379 |
| 5,760,380 A | * | 6/1998 | May | 235/379 |
| 5,796,083 A | * | 8/1998 | Kenneth et al. | 235/380 |
| 5,828,043 A | * | 10/1998 | Nicoll et al. | 235/380 |
| 5,861,614 A | * | 1/1999 | Gardner | 235/379 |
| 5,929,413 A | * | 7/1999 | Gardner | 235/379 |
| 5,929,426 A | * | 7/1999 | May | 235/475 |
| 6,182,893 B1 | * | 2/2001 | Greene et al. | 235/380 |
| 6,315,283 B1 | * | 11/2001 | Haas et al. | 271/124 |
| 6,398,108 B1 | * | 6/2002 | Swinton et al. | 235/379 |
| 6,439,345 B1 | * | 8/2002 | Recktenwald et al. | 186/55 |
| 2003/0091145 A1 | * | 5/2003 | Mohr et al. | 375/58 |

FOREIGN PATENT DOCUMENTS

| | | | |
|---|---|---|---|
| GB | 2177530 | | 1/1987 |
| JP | 11-154251 A | * | 6/1999 |
| JP | 2001-155116 A | * | 6/2001 |

* cited by examiner

*Primary Examiner*—Jared J Fureman
(74) *Attorney, Agent, or Firm*—Michael Chan

(57) ABSTRACT

A self-service terminal (SST) (10) having a reconfigurable media entry slot is provided. The slot (16) has paired vertically movable (22) and horizontally movable (20) shutters located so as to be capable of being moved to restrict the size of the slot (16). In use, the SST (10) determines the orientation and size of media to be entered, and adjusts the slot (16) size accordingly by means of motors (28, 30) driving the shutters. An indicator (18) may also be provided to further indicate to a user the expected media size, with media sensors (32) being present to further avoid entry of incorrect media.

6 Claims, 1 Drawing Sheet

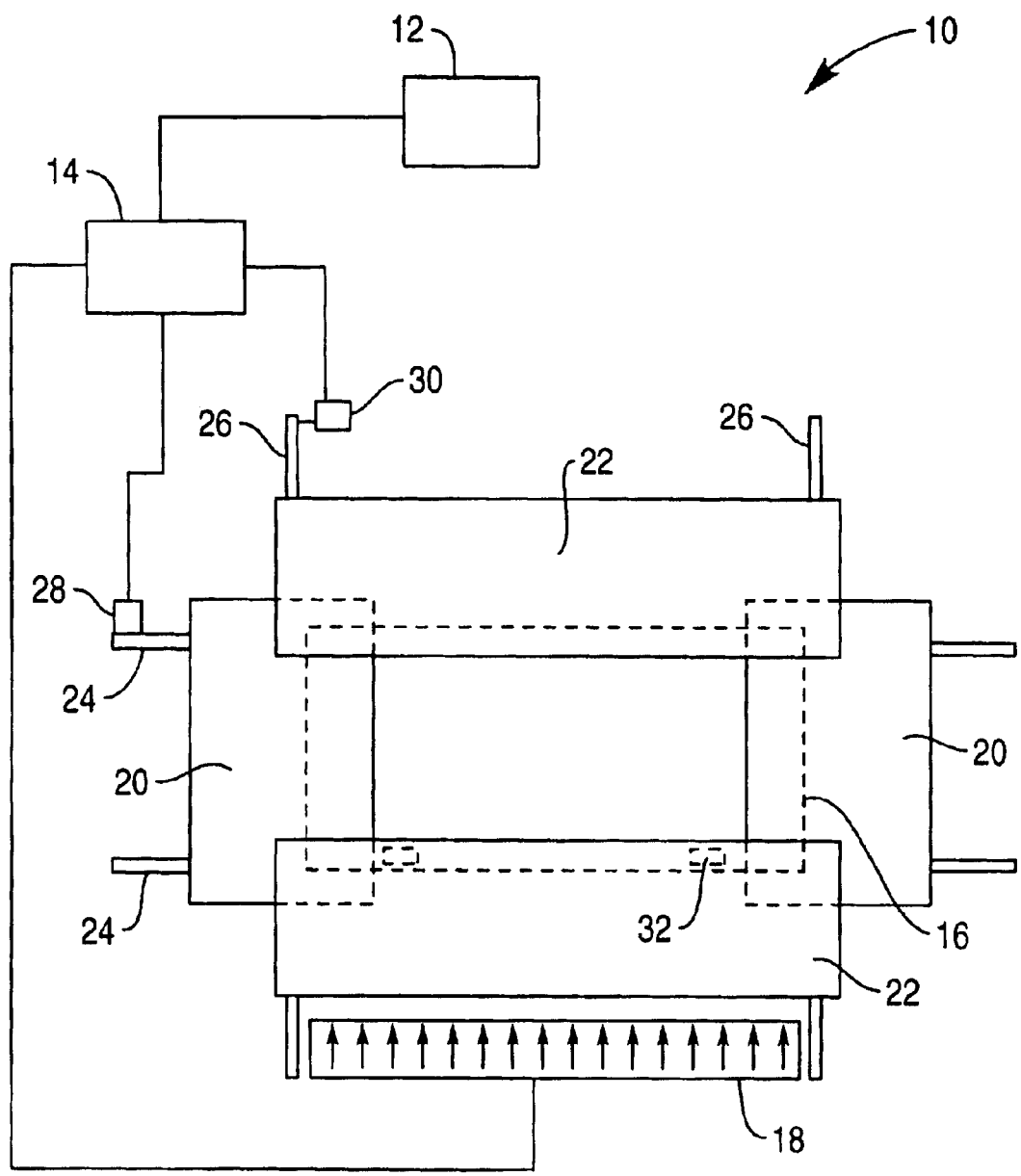

SELF-SERVICE TERMINAL HAVING A RECONFIGURABLE MEDIA ENTRY SLOT

BACKGROUND OF THE INVENTION

The present invention relates generally to self-service terminals (SSTs), such as automated teller machines (ATMs), and more particularly to a SST with a reconfigurable media entry slot.

Self-service terminals (SSTs) are commonly used for services, such as banking services, where a number of different types of media may be deposited in the SST by a user. For example, if a bank customer wishes to deposit some money into their account, they may have the option of depositing single banknotes, multiple banknotes simultaneously (known as a "bunch" deposit), a bunch of banknotes in a deposit envelope, or a check. To provide the widest possible range of services, therefore, an SST must be able to accept media of all these types. The situation is however further complicated by the fact that different media types have different preferred orientations for deposit into an SST, due to the different media transport mechanisms and recognition systems required for an SST to handle each of the media types. For example, single or bunched banknotes are preferably deposited with their long edge leading, while checks and deposit envelopes are generally deposited short edge leading. Further, there is a significant difference in thickness between a single banknote and a bunch; or between a check and an item in a deposit envelope.

Therefore, an SST capable of accepting multiple media types must either provide a dedicated deposit slot for each media type, or a single deposit slot large enough to accept all media types. The first of these approaches has the drawback that space on a SST fascia is limited, and a profusion of deposit slots may confuse users; while the second approach increases the likelihood that a customer will attempt to deposit media incorrectly, leading to rejection of the deposit and frustration for the customer. Neither of these solutions is thus entirely satisfactory.

SUMMARY OF THE INVENTION

It is among the objects of embodiments of the present invention to obviate or alleviate these and other disadvantages of the prior art.

According to a first aspect of the present invention, there is provided a self-service terminal (SST) comprising a media entry slot defining an entry aperture, a shutter movable into at least partly overlapping relationship with the slot to restrict the dimensions of the aperture, and control means for moving the shutter relative to the slot to provide an aperture of a desired size.

Thus, the present invention provides a media entry slot which is adjustable to a specific size, so restricting the possibility of depositing an incorrect media type therein or depositing a media type other than in the correct orientation. For example, if the SST requests the user to deposit a check, the shutter may be moved to restrict the aperture to a size appropriate to deposit a single check-sized item with the short edge leading.

Preferably the SST further comprises a transaction processing means, for controlling the flow of transactions, operably linked to the shutter control means, such that the shutter may be adjusted in response to the flow of a transaction. For example, if the processing means determines that a user is about to deposit a check, the shutter may be moved to provide an aperture of an appropriate size.

Preferably, the SST comprises a plurality of shutters. While a single shutter may provide sufficient adaptability of the aperture for most purposes, for example being movable horizontally to vary the width of the aperture, it may be preferable to provide a plurality of shutters, movable in different directions, to give greater flexibility in the configuration of the aperture. Preferably, at least one shutter is movable vertically with respect to the slot, and at least one shutter is movable horizontally. More preferably either or both of the vertically or horizontally movable shutters are provided as paired opposed shutters. This provides for more precise adjustment of the aperture, and also may be used to ensure that the aperture is always positioned centrally of the slot.

Where a number of relatively perpendicularly movable shutters are employed, it is preferred that the shutters are arranged such that, in use, the outermost shutters (those nearest the user of the SST) open after the shutters farther from the user. In this way the aperture presented to the user will be initially of the correct size in one dimension. It is further preferred that, during adjustment of the aperture, the outer shutters are moved to close the aperture while the inner shutters are adjusted to the correct position for forming an appropriate aperture.

It is preferred that the shutter or shutters are arranged so as to close the aperture when the entry slot is not in use. This provides increased security and weather protection to the SST.

Preferably, the SST further comprises sensors disposed in the slot, to detect the dimensions of entered media. When the aperture is in its largest configuration, it is still possible that a user may attempt to deposit incorrect smaller media or media in an incorrect orientation. The presence of media sensors may assist in determining whether or not entered media is of the correct orientation or type. The media sensors may be connected to SST transaction processing means; if an incorrect media type is entered, the media may be returned to the user, and a message displayed on the SST informing the user which type of media is expected. Alternatively, the media may be returned, and the aperture reconfigured to accept that type of media, so that the user may re-enter their media.

Preferably the SST further comprises indicator means located adjacent the slot to inform users of the orientation or dimensions of media to be deposited. Preferably the indicator means comprises a plurality of light-emitting means arranged along the length of the slot; when a media deposit is expected, a number of light-emitting means may be activated to denote the size of the aperture currently in use and the dimensions and preferred orientation of the expected media. In one embodiment, the light-emitting means may be in the form of arrows or other directional symbols, highlighting the direction of media entry. Alternative forms of indicator means may be used: for example, an area of color-changing material, such as thermochromic plastic; tactile means, such as a series of raised dots or shapes; or auditory means, such as a sound generated by the SST which is associated with a particular media type, orientation, or aperture size.

According to a second aspect of the present invention, there is provided a method of accepting media entered into a self-service terminal (SST), the method comprising the steps of:

determining the type of media to be entered;
determining a preferred aperture size for entry of the determined media type;

adjusting the size of an aperture provided in the SST fascia to correspond with the preferred aperture size; and accepting media entered into the aperture.

Preferably the size of the aperture is adjusted by moving a shutter into at least partly overlapping relationship with a media entry slot provided on the SST, to provide an aperture of a desired size.

Preferably a plurality of shutters are moved. Most preferably, paired horizontally and/or vertically movable shutters are moved. Preferably the method further comprises the steps of: moving a first shutter disposed behind a second shutter into at least partly overlapping relationship with a media entry slot; and moving the second shutter into at least partly overlapping relationship with the media entry slot. Preferably the method further comprises the step of moving the second shutter into completely overlapping relationship with a media entry slot, that is to substantially close the media entry slot prior to moving the first and second shutters into at least partly overlapping relationship with the media entry slot.

Preferably the method further comprises the steps of:

sensing the dimensions and/or orientation of entered media; and rejecting the entered media if the sensed dimensions and/or orientation differ from the expected dimensions and/or orientation of the entered media.

Preferably the method further comprises the step of indicating to a user an expected dimension and/or orientation of the media to be entered, prior to media entry.

According to a further aspect of the present invention, there is provided a self-service terminal (SST) comprising a media port defining an aperture, a shutter movable into at least partly overlapping relationship with the port to restrict the dimensions of the aperture, and control means for moving the shutter relative to the port.

BRIEF DESCRIPTION OF THE DRAWINGS

These and other aspects of the present invention will now be described by way of example only and with reference to the accompanying FIGURE, which shows a schematic diagram of a self-service terminal in accordance with one embodiment of the present invention.

DETAILED DESCRIPTION

The FIGURE shows a schematic diagram of certain parts of a self-service terminal (SST) 10 in the form of an automated teller machine (ATM). The SST 10 includes a transaction flow processor 12, to control the flow of transactions, a shutter control mechanism 14, a media deposit slot 16, and an aperture indicator 18. Mounted in front of the slot 16 are a pair of horizontally-movable shutters 20, and in front of the horizontally movable shutters 20 a pair of vertically-movable shutters 22. Each shutter 20, 22 is mounted on a pair of guide tracks 24, 26, and is movable by the actuation of a motor 28, 30 controlled by the shutter control mechanism 14. Both shutters of a pair 20, 22 are operably linked such that movement of one shutter of the pair causes an equal movement in the opposite direction of the other shutter of the pair. Located in the slot 16 are a pair of media sensors 32.

The operation of the SST 10 will now be described.

At the outset of a transaction, both horizontally movable shutters 20 and vertically movable shutters 22 are closed, so that no access is possible to the media deposit slot 16. After a user has activated the SST, the user may for example request to deposit some money into their bank account.

The transaction flow processor 12 thus identifies that a media deposit is to be made, and may either query the user to determine the type of media to be deposited; or may inform the user that only a specific media type may be deposited. For example, the SST may determine that a single check is to be deposited.

Once the media type has been determined, the transaction flow processor 12 activates the shutter control mechanism 14, informing it of the type of media to be deposited. The control mechanism 14 retrieves details of a desired shutter position for that type of media from a reference table stored in memory.

In the present example, checks are intended to be deposited singly, with their short edge leading. The control mechanism 14 therefore actuates the motor 28 of the horizontally movable shutters 20, to move these shutters 20 into the desired position, to provide an opening of the correct width for a short edge leading deposit.

After the shutters 20 have reached the correct position, the vertically movable shutters 22, which have been closed until now, are opened to the desired position. This then provides an opening of the correct size for the desired media deposit; keeping one set of shutters closed while the other set reaches the correct position also prevents a user from depositing their media before the SST is ready to accept the deposit.

Once the aperture of the correct size is formed, the shutter control mechanism 14 also activates the aperture indicator 18, which comprises a series of lights in the form of arrows across the entrance to the deposit slot 16. Only those lights corresponding to the width of the aperture are activated, so indicating to the user where to deposit their media, and also indicating the correct orientation of the media.

The user then deposits their media into the slot 16, and the transaction proceeds in a conventional manner.

The slot 16 is provided with a pair of horizontally-spaced media detectors 32 along the lower edge thereof. If the shutters are configured to allow deposit of long-edge leading media, these sensors 32 may be actuated to ensure that any deposited media contacts or covers both sensors 32 of the pair; if neither or only one of the sensors is contacted, the user has attempted to deposit short-edge leading media, which will then be rejected.

Similarly, media thickness sensors may be disposed across a vertical axis of the slot 16, to ensure that, if a bunched media deposit is expected, the user does not deposit single sheet media.

It can be seen from the foregoing that the present invention provides a self-service terminal which is capable of accepting deposits of a variety of media types in a variety of orientations through a single media deposit slot, while reducing the possibility of incorrect deposits being made.

The foregoing description refers to media deposit; however, the present invention is not limited thereto, and may find application in any situation where items are intended to be deposited in a variety of orientations or sizes; and may also be used where media or items are to be dispensed.

What is claimed is:

1. A self-service terminal comprising:

means defining a media entry slot;

shutter means movable into at least partly overlapping relationship with the slot, the shutter means comprising a plurality of shutters; and control means for moving the shutter means relative to the slot to define an entry aperture.

2. A self-service terminal according to claim 1, wherein one shutter is movable vertically relative to the slot, and another shutter is movable horizontally relative to the slot.

3. A self-service terminal comprising:

means defining a media entry slot;

shutter means movable into at least partly overlapping relationship with the slot, the shutter means comprising paired opposed shutters; and control means for moving the shutter means relative to the slot to define an entry aperture.

4. A self-service terminal comprising:

means defining a media entry slot;

a number of shutters movable into at least partly overlapping relationship with the slot, the number of shutters comprising a plurality of shutters; and a controller for moving the shutters relative to the slot to define an entry aperture.

5. A self-service terminal according to claim 4, wherein one shutter is movable vertically relative to the slot, and another shutter is movable horizontally relative to the slot.

6. A self-service terminal comprising:

means defining a media entry slot;

a number of shutters movable into at least partly overlapping relationship with the slot, the number of shutters comprising a number of paired opposed shutters; and a controller for moving the shutters relative to the slot to define an entry aperture.

* * * * *